(12) United States Patent
Crook et al.

(10) Patent No.: US 8,711,238 B2
(45) Date of Patent: Apr. 29, 2014

(54) SYSTEMS AND METHODS FOR SYNCHRONIZING AND CONTROLLING MULTIPLE IMAGE SENSORS

(75) Inventors: Neal Crook, Reading (GB); Elaine W. Jin, Fremont, CA (US)

(73) Assignee: Aptina Imaging Corporation, George Town (KY)

( * ) Notice: Subject to any disclaimer, the term of this patent is extended or adjusted under 35 U.S.C. 154(b) by 246 days.

(21) Appl. No.: 13/157,092

(22) Filed: Jun. 9, 2011

(65) Prior Publication Data
US 2012/0194712 A1    Aug. 2, 2012

Related U.S. Application Data

(60) Provisional application No. 61/438,598, filed on Feb. 1, 2011.

(51) Int. Cl.
*H04N 5/232* (2006.01)
*H04N 5/225* (2006.01)
*H04N 9/09* (2006.01)
*H04N 9/097* (2006.01)

(52) U.S. Cl.
USPC .................... 348/211.3; 348/262; 348/207.11

(58) Field of Classification Search
USPC .................. 348/207.1, 207.11, 211.1–211.13
See application file for complete search history.

(56) References Cited

U.S. PATENT DOCUMENTS

| | | | |
|---|---|---|---|
| 6,980,522 B2 * | 12/2005 | Boyle | 370/252 |
| 7,333,725 B1 * | 2/2008 | Frazier | 396/263 |
| 7,511,764 B2 | 3/2009 | Cooper | |
| 7,557,849 B2 | 7/2009 | Pan | |
| 7,623,177 B2 | 11/2009 | Nakamura | |
| 2002/0171741 A1 * | 11/2002 | Tonkin et al. | 348/211.3 |
| 2003/0074505 A1 * | 4/2003 | Andreas et al. | 710/110 |
| 2004/0150724 A1 * | 8/2004 | Nozaki et al. | 348/211.4 |
| 2008/0036864 A1 | 2/2008 | McCubbrey | |
| 2008/0309774 A1 | 12/2008 | Beng Goh | |
| 2009/0278951 A1 | 11/2009 | Loose | |
| 2011/0119405 A1 | 5/2011 | Parr | |
| 2011/0267432 A1 * | 11/2011 | Kumakura | 348/47 |

* cited by examiner

*Primary Examiner* — Sinh Tran
*Assistant Examiner* — Christopher K Peterson
(74) *Attorney, Agent, or Firm* — Treyz Law Group; Chih-Yun Wu (57) ABSTRACT

An Electronic device may include a master camera module, a slave camera module, and host subsystems. The master camera module may control some of the operations of the slave camera module. The master camera module may transmit data to the slave camera module. The master camera module may interrupt data transmission to the slave camera module, when a delay-sensitive event occurs, to transmit information corresponding to the delay-sensitive event. The slave camera module may respond to the event information with a predetermined fixed delay relative to the occurrence of the event at the master camera module.

18 Claims, 8 Drawing Sheets

SYSTEMS AND METHODS FOR SYNCHRONIZING AND CONTROLLING MULTIPLE IMAGE SENSORS

This application claims the benefit of provisional patent application No. 61/438,598, filed Feb. 1, 2011, which is hereby incorporated by reference herein in its entirety.

BACKGROUND

The present invention relates generally to image sensor circuitry, and more particularly, to a system with a plurality of image sensors.

Image sensors are commonly used in electronic devices such as cellular telephones, cameras, and computers to capture images. In a typical arrangement, an electronic device is provided with a single image sensor and a single corresponding lens. The single image sensor of a typical arrangement can only capture a single image from the fixed viewing angle of the corresponding lens. However, some applications such as stereoscopic vision (e.g., 3D imaging) and machine vision may require captured images from two or more viewpoints. Efficient implementation of an electronic device that incorporates two or more separate image sensors to capture images from physically distinct positions and viewing angles poses challenges. For example, care must be taken when synchronizing frames generated from multiple image sensors.

Therefore, it would be desirable to design a system for controlling and synchronizing a plurality of image sensors.

DETAILED DESCRIPTION

Embodiments of the present invention relate to electronic devices with a plurality of camera modules. Electronic devices for applications such as stereoscopic vision (e.g., 3D vision) and machine vision may include two or more camera modules to capture images from varying viewpoints and viewing angles. For example, in an arrangement for 3D vision applications, a first camera module may capture images from a first viewing angle, and a second camera module may capture images from a second viewing angle. The first viewing angle may represent the image seen by a person's left eye and the second viewing angle may represent the image seen by a person's right eye. A 3D image may be constructed from combining the first captured image with the second captured image. Machine vision arrangements may include two or more camera modules and the viewpoints of the camera modules may not correspond to a person's left and right eyes.

Figure 1:
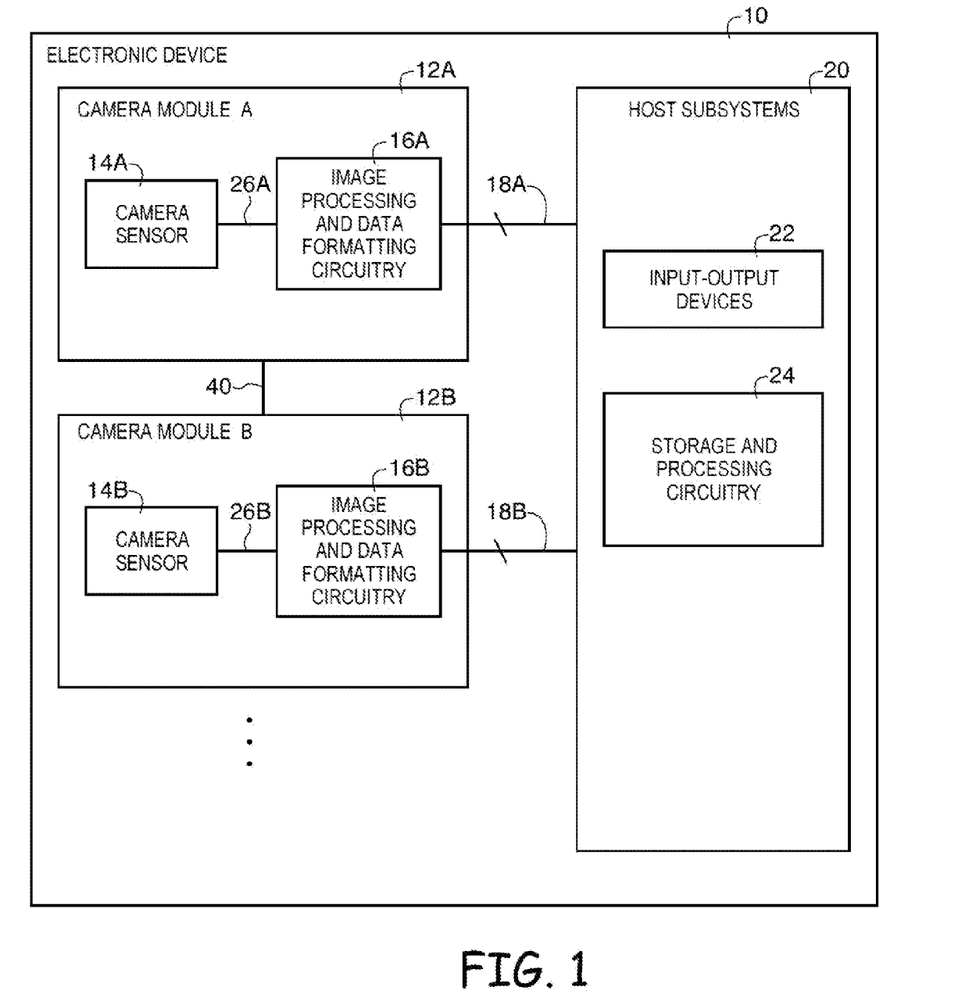
FIG. 1 is a schematic diagram of an illustrative electronic device with a plurality of camera modules in accordance with an embodiment of the present invention.

An electronic device with a plurality of digital camera modules is shown in FIG. 1. Electronic device 10 may be a digital camera, a computer, a cellular telephone, a medical device, or other electronic device. Each camera module 12 may include image sensor 14 and one or more lenses. During operation, the lenses in each camera module 12 focus light onto the image sensor 14 in that camera module 12. Each image sensor 14 includes photosensitive elements (i.e., pixels) that convert the light into digital data. Image sensors may have any number of pixels (e.g., hundreds, thousands, millions, or more). A typical image sensor may, for example, have millions of pixels (e.g., megapixels).

Still and video image data from each camera sensor 14 may be provided to corresponding image processing and data formatting circuitry 16 via paths 26. Image processing and data formatting circuitry 16 may be used to perform image processing functions such as data formatting, adjusting white balance and exposure, implementing video image stabilization, face detection, etc. Image processing and data formatting circuitry 16 may also be used to calculate algorithm metrics such as image exposure metrics, image brightness metrics, gain metrics, color temperature metrics, or other image metrics (sometimes referred to as auto algorithm values). Image processing and data formatting circuitry 16 may also be used to compress raw camera image files if desired (e.g., to Joint Photographic Experts Group or JPEG format). In a typical arrangement, which is sometimes referred to as a system on chip or SOC arrangement, camera sensor 14 and image processing and data formatting circuitry 16 are implemented on a common integrated circuit. The use of a single integrated circuit to implement camera sensor 14 and image processing and data formatting circuitry 16 can help to minimize costs.

The image processing circuitry 16 in each camera module 12 may calculate algorithm values (e.g., by using algorithm metrics). Algorithm values may sometimes be referred to herein as image capture parameters and may include, as examples, an exposure setting, a gain setting, a color temperature setting, a framerate setting, an ambient brightness value, and a color correction setting. The calculated algorithm values may configure settings for a respective sensor module 14 (e.g., an exposure setting, a gain setting, a color temperature setting, a framerate setting, an ambient brightness value, and a color correction setting). For applications that use captured image data from two or more camera modules 12, it may be desirable to use a single set of algorithm values to configure settings for each sensor module 14 of camera modules 12. As an example, the algorithm metrics captured in a first camera module 12 may be used as the input to the algorithm values calculated on all camera modules 12. A second way to achieve this is to use the algorithm values calculated in a first camera module 12 directly on all camera modules 12. For example, in a 3D vision application, a first and second camera module may capture images of a single scene from a first viewing angle and a second viewing angle. To assist in 3D image construction, it may be desirable for the second camera module to use the first color correction setting calculated by the first camera module (as an example).

Camera modules 12 that are operated for stereoscopic vision applications may be programmed to transfer information such as the algorithm values from image processing circuitry 16 in a particular camera module (e.g., image processing circuitry 16A in camera module 12A) to other camera modules (e.g., image processing circuitry 16B in camera module 12B). Camera modules 12 may transfer information to other camera modules 12 and may receive information from other camera module 12 via paths 40.

Each camera module 12 (e.g., image processing and data formatting circuitry 16) may convey acquired image data to host subsystem 20 over corresponding paths 18. Electronic device 10 typically provides a user with numerous high-level functions. In a computer or advanced cellular telephone, for example, a user may be provided with the ability to run user applications. To implement these functions, host subsystem 20 of electronic device 10 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

Figure 2:
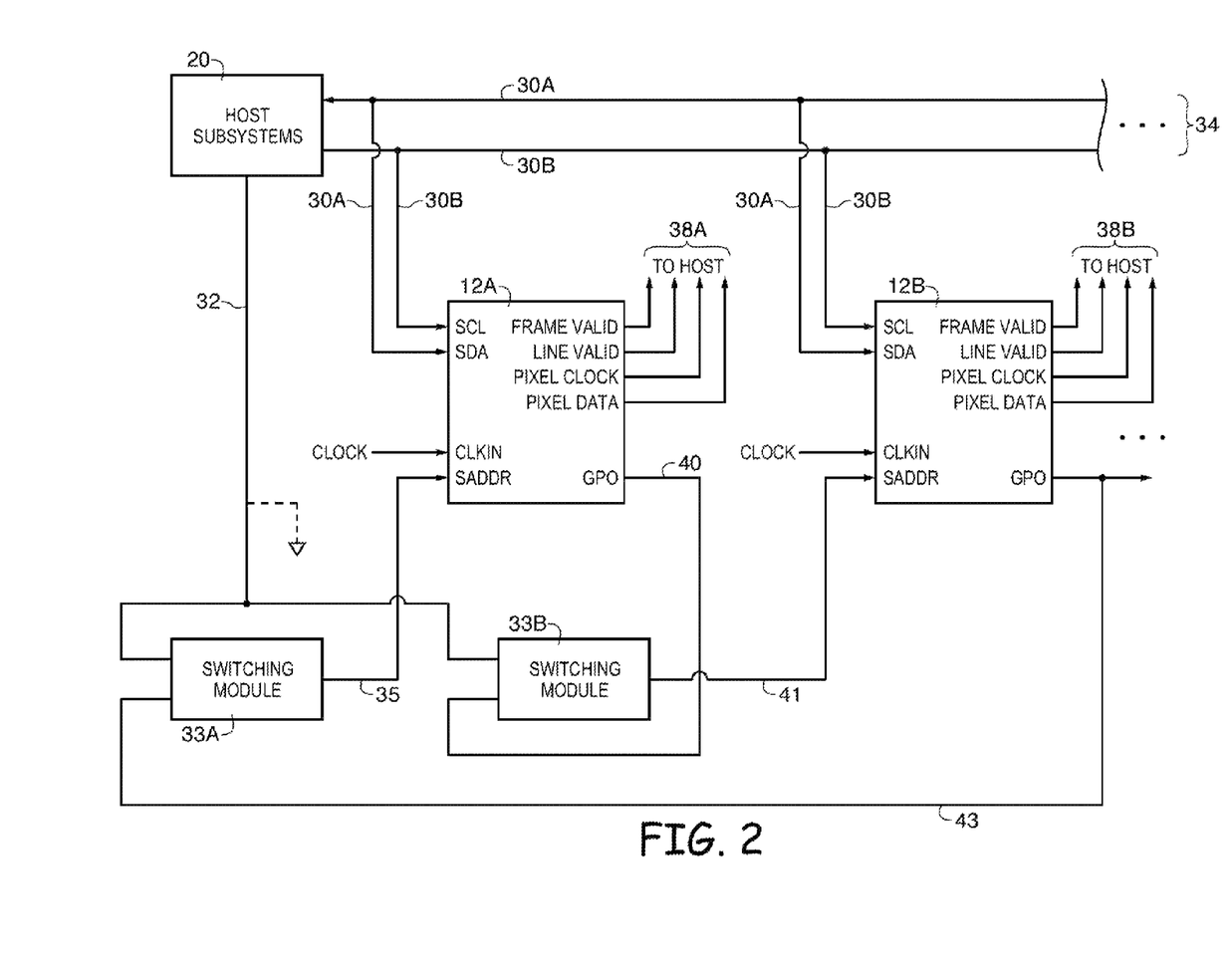
FIG. 2 is a schematic diagram of illustrative connections between host subsystems and a plurality of camera modules in accordance with an embodiment of the present invention.

Each camera module 12 may be configured to be either a master or a slave. As shown in the diagram of FIG. 2, camera module 12A may be configured as a master and camera module 12B may be configured as a slave, as an example. Master camera module 12A and slave camera module 12B may sometimes be referred to herein as a master-slave pair. Camera modules 12 may have ports such as a serial clock (SCL) port, a serial data line (SDA) port, a frame valid port, a line valid port, a pixel clock port, a pixel data port, a clock in (CLKIN) port, a general purpose output (GPO) port, and a serial address (SADDR) port. Paths 30A, 30B, 32, 38A may correspond to paths 18A of FIG. 1. Paths 30A, 30B, 32, and 38B may be part of paths 18B of FIG. 1.

The serial clock (SCL) port in each camera module 12 may receive a clock signal that may be used in receiving and transmitting serial data through the serial data (SDA) port. The SDA port in each camera module 12 may receive and convey information about internal settings. As an example, camera module 12A may receive control signals from host subsystem 20 through the serial data port that modifies the internal settings of camera module 12A to enable image capture or disable image capture. The pixel data port in each camera module 12 may convey pixel data associated with images captured by the image sensor 14 in that camera module 12. The frame valid port in each camera module 12 may provide information on when that camera module 12 is transmitting pixel data for an image frame over paths 18. The line valid port in each camera module 12 may convey information on when that camera module 12 is transmitting pixel data for each particular line in an image frame over paths 18. The pixel clock port in each camera module 12 may convey a clock from that camera module 12. As examples, the clock may be used in clocking circuitry internal to that camera module 12 and may be used in transmitting (e.g., clocking) frame valid, line valid, and pixel data signals over paths 38.

The SADDR port of master camera module 12A may be coupled to host subsystems 20 via path 32, switching module 33A, and path 35. With another suitable arrangement, the SADDR port of master camera module 12A may be grounded to a power supply ground, if desired. The SDA port of master camera module 12A may be coupled to host subsystems 20 via path 30A. The SCL port of master camera module 12A may be coupled to host subsystems 20 via path 30B. The frame valid, line valid, pixel clock, and pixel data ports of master camera module 12A may be coupled to host subsystems 20 via paths 38A. The CLKIN port of master camera module 12A may receive a digital clock signal. The digital clock signal may, if desired, be produced by host subsystems 20 and received from host subsystems 20 over path 18. The GPO port of master camera module 12A may be coupled to the SADDR port of slave camera module 12B via path 40. The GPO port of master camera module 12A may convey information such as control information or captured image data information from master camera module 12A to slave camera module 12B over path 40, switching module 33B, and path 41. Ports frame valid, line valid, pixel clock, and pixel data may correspond to information relating to images captured by master camera module 12A. For example, the frame valid port of master camera module 12A may convey information describing when master camera module 12A is transmitting captured image data over paths 38A.

The SDA port of slave camera module 12B may be coupled to host subsystems 20 via path 30A. The SCL port of slave camera module 12B may be coupled to host subsystems 20 via path 30B. The frame valid, line valid, pixel clock, and pixel data ports of slave camera module 12B may be coupled to host subsystems 20 via paths 38B. The CLKIN port of slave camera module 12B may receive a digital clock signal. The digital clock signal may, if desired, be produced by host subsystems 20 and received from host subsystems 20 over path 18. Ports frame valid, line valid, pixel clock, and pixel data of slave camera module 12B may correspond to information relating to images captured by slave camera module 12B.

It should be understood that the number of slave camera modules 12B in the arrangement of FIG. 2 is merely illustrative. The number of slave camera modules in the arrangement of FIG. 2 may be increased by adding additional slave camera modules configured in the same way as slave camera module 12B (e.g., by coupling the SADDR port of each additional camera module to the GPO port of one other camera module). As an example, a third slave camera module may be added and the SADDR port of the third slave camera module may be coupled to the GPO port of slave camera module 12B).

It may be desirable to select which camera module 12 is the master camera module. For example, due to manufacturing variations, each camera module 12 may have slightly different performance characteristics (e.g., performance characteristics affected by relatively small manufacturing variations such as microlens variations, wafer variations, photodiode variations, transistor variations, IR-cut filter variations, imaging lens variations, or other manufacturing variations). Camera modules with certain variations may produce image capture parameters that are less accurate than camera modules with certain other variations. It may be desirable to identify which camera module produces more desirable image capture parameters and select the camera module that produces the most desirable image capture parameters as the master.

Optional switching modules 33A and 33B may be used to select one of camera modules 12 as the master. Switching module 33A may couple either path 32 or path 43 to the SADDR port of camera module 12A via path 35. Switching module 33B may couple either path 32 or path 40 to the SADDR port of camera module 12B.

As an example, when host subsystems 20 or other circuitry selects camera module 12A as the master and camera module 12B as the slave, switching module 33A may be configured to couple path 32 to path 35 and switching module 33B may be configured to couple path 40 to path 41. In this way, host subsystems 20 may be coupled to the SADDR port of camera module 12A and the GPO port of camera module 12A may be coupled to the SADDR port of camera module 12B.

As another example, when host subsystems 20 or other circuitry selects camera module 12B as the master and camera module 12A as the slave, switching module 33A may be configured to couple path 43 to path 35 and switching module 33B may be configured to couple path 32 to path 41. In this case, host subsystems 20 may be coupled to the SADDR port of camera module 12B and the GPO port of camera module 12B may be coupled to the SADDR port of camera module 12A.

The examples of arrangements in which it may be desirable to select which camera module 12 as the master camera module described above can, if desired, be applied to arrangement with more than two camera modules 12 coupled together. In such arrangements, additional switching modules and paths may be included as desired.

If desired, the particular camera module 12 that will serve as the master camera module may be predetermined (e.g., may not vary based on varying performance characteristics). In arrangements of this type, switching modules 33A and 33B may be omitted, path 32 may be coupled to the SADDR port of camera module 12A, and the GPO port of camera module 12B may be coupled to the SADDR port of camera module 12B. Additional camera modules may be daisy-chained onto camera modules 12A and 12B in a similar fashion, if desired.

In a preferred implementation, each switching module 33A may be integrated within the camera module 12A and configured through paths 30A and 30B.

Paths 30 (e.g., paths 30A and 30B) may be configured as a bus (e.g., an inter-integrated circuit (I2C) bus). Host subsystems 20 may convey bus clock information over path 30B to master camera module 12A. Host subsystems 20 may convey bus clock information over path 30B to slave camera module 12B. Host subsystems 20 may read or modify internal settings of camera modules 12 (e.g., 12A and 12B) by conveying read requests and write requests over paths 30. As an example, host subsystems 20 may convey write requests over path 30A that configure camera module 12A to capture an image and output the captured image over paths 38A.

Each of camera modules 12 may be configured with a first address and a second address, which may correspond to addresses in bus 30 (e.g., a first address and a second address through which each camera module 12 may be accessed on bus 30). The SADDR port of camera modules 12 may determine whether a camera module responds to the first address or to the second address (e.g., a low level on SADDR may determine whether the camera module responds to the first address and a high level on SADDR may determine whether the camera module responds to the second address). Host subsystems 20 can reconfigure the values of the first address and/or the second address through bus 30. Output GPO of camera modules 12 may be configured to drive a low level (e.g., output GPO of camera module 12A may be configured to drive a low level to the SADDR port of camera module 12B via path 40). Host subsystems 20 may reconfigure the output GPO of camera modules 12 through bus 30.

Master camera module 12A may respond to read requests and write requests on paths 34 (e.g., read accesses and write accesses on paths 30A and 30B) that are addressed to the first address of master camera module 12A. The first address of slave camera module 12B may be different from the first address of master camera module 12A (e.g., slave camera module 12B may respond to read and write requests on paths 34 that are addressed to a bus address different from the first address of master camera module 12A).

The second addresses of master camera module 12A and slave camera module 12B may be identical. With arrangements of this type, write requests (and, if desired, read requests) addressed to the second address, which is common to both master camera module 12A and slave module 12B, may propagate to camera module 12A and camera module 12B simultaneously. For example, master camera module 12A and slave camera module 12B may each be configured with the same second address. Master camera module 12A and slave camera module 12B may be configured so that a write request to the common second address propagates to both master camera module 12A and slave camera module 12B (as an example). Master camera module 12A may be configured to respond to read requests to the common second address. Slave camera module 12A may, if desired, be configured to ignore read requests to the common second address. Write requests to the second address may sometimes be referred to herein as broadcast requests and broadcast accesses. A master-slave pair configured in this way may appear to host subsystems 20, for purposes of controlling the camera modules, as only a single camera module.

In an initial state of camera modules 12, the SADDR port of a first camera module (12A) may be driven to a low logic level and the GPO port of each camera module 12 that is coupled to camera module 12A may be driven to a high logic level. In this way, the SADDR port of camera module 12B and other camera modules 12 that are coupled to camera module 12A may be driven to a high logic level. In this initial state, host subsystems 20 may communicate with camera module 12A on bus 30 using an initial value of the first address, and thereby assign a first unique value for the first address of camera module 12A. The host subsystems 20 may then communicate with camera module 12A on bus 30 using the first unique value for the first address.

Host subsystems 20 may direct camera module 12A to change the level of its port GPO from a high logic level to a low logic level (e.g., using the assigned first address). Host subsystems 20 may then communicate with camera module 12B via bus 30 using an initial value of the first address to assign a second unique value for the first address of camera module 12B. Host subsystems 20 may then communicate with camera module 12B via bus 30 using the assigned first address of camera module 12B and direct camera module 12B to change the level port GPO of camera module 12B from a high logic level to a low logic level.

By repeating this process, host subsystems 20 may assign a unique value for the first address of each camera module 12 in the system. The order in which host subsystems 20 assigns new unique values to the first address of camera modules 12 may be deterministic (e.g., the order may correspond to the topology of the connections between the camera modules 20. The topology of the connections between the camera modules 12 may correspond to the relative position of the camera modules 12. This may allow host subsystems 20 to associate a particular unique assigned address to a particular camera module 12 (e.g., to assign and associate a first unique assigned address to master camera module 12A of a master-slave pair and to assign and associate a second unique assigned address to slave camera module 12B of a master-slave pair).

Camera modules 12 may capture multiple images in succession using camera sensors 14. For example, camera modules 12 may be used for capturing video (e.g., in a video application) in which multiple images may be captured in sequence. Each captured image in the sequence of captured images may be referred to as a frame. Each frame may be given an associated frame sequence number. For example, a first frame captured by a master camera module 12A may be given a frame sequence number one, while a second frame captured by the master camera module 12A sequentially after the first may be given a frame sequence number 2. Frames captured by a slave camera module 12B may be associated with frames captured by a master camera module 12A. For example, a first frame captured by slave camera module 12B may be associated with the first frame captured by master camera module 12A, which may have been given frame sequence number one. The first frame captured by slave camera module 12B may be given frame sequence number one to match the associated frame captured by the master camera module 12A. The sequence number associated with each frame captured by camera modules 12 may be conveyed to host subsystems 20 over paths 38 (e.g., over paths 18).

Host subsystems 20 may use the frame sequence numbers conveyed from camera modules 12 to assist in imaging applications. For example, in a 3D imaging application, a master-slave pair may be configured to emulate a person's vision (e.g., master camera module 12A may correspond to the image produced by a user's left eye and slave camera module 12B may correspond to the image produced by a user's right eye). In this case, host subsystems 20 may use the frame sequence numbers associated the frames produced by master camera module 12A and slave camera module 12B to construct a 3D image sequence from the frames produced by camera modules 12A and 12B (e.g., two frames with the same frame sequence numbers may represent frames that were captured simultaneously by camera modules 12A and 12B).

Figure 3:
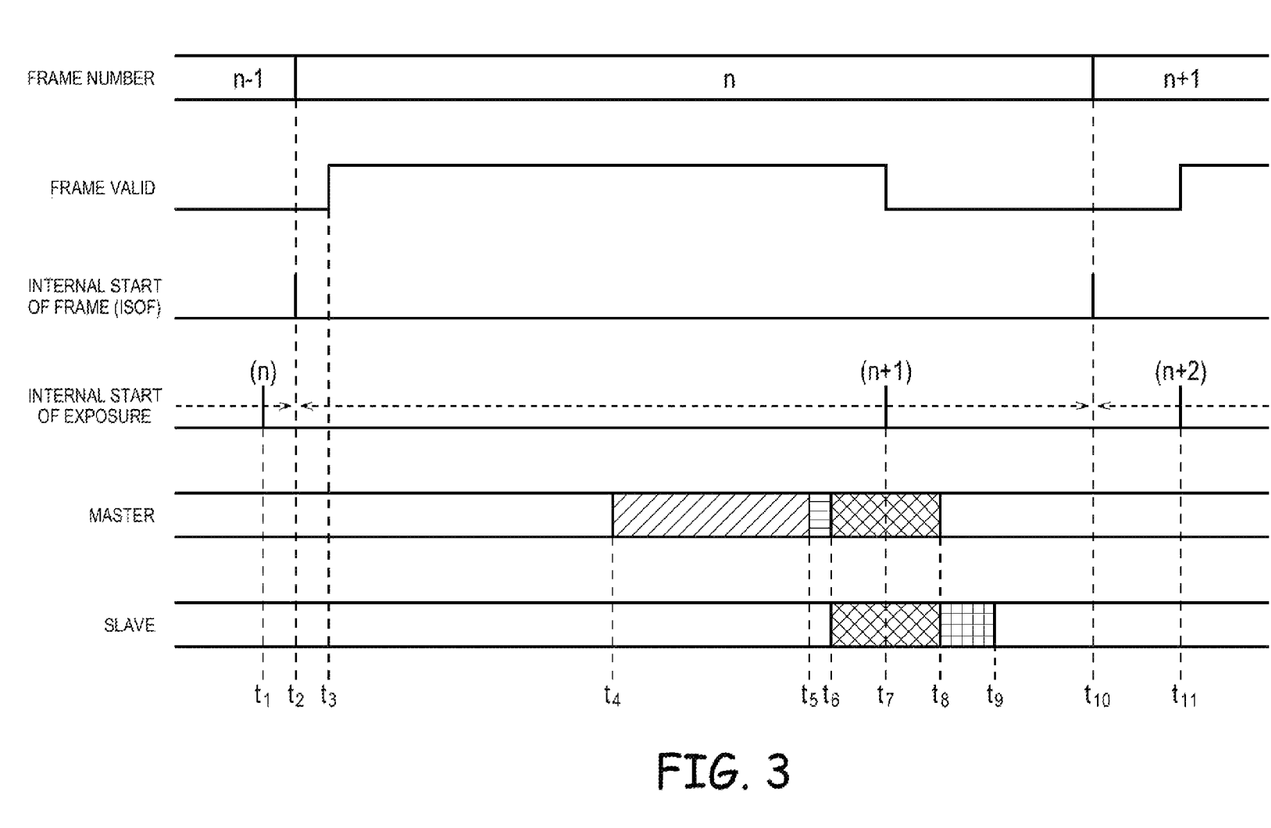
FIG. 3 is an illustrative timing diagram illustrating relative timing of various events in a master camera module and at least one slave camera module that may be at least partially synchronized with and controlled by the master camera module in accordance with an embodiment of the present invention.

Captured image frames from each camera module 12 may be generated at fixed time intervals. Camera modules 12 used for a 3D video imaging application may generate captured image frames every 1/30th or 1/60th of a second (as examples). The master camera module 12A of a master-slave pair used for a 3D video imaging application may transfer algorithm values to the slave camera module 12B of the master-slave pair for each frame generated (e.g., the master camera module 12A may transfer a brightness metric to the slave camera module 12B every 1/30 or 1/60 of a second). The number of frames captured by each camera module 12 per second may be referred to as the capture framerate (e.g., 30 frames per second or 60 frames per second). FIG. 3 illustrates illustrative timing constraints associated with the transfer of algorithm values from a master camera module 12A to a slave camera module 12B via path 40.

In the diagram of FIG. 3, the internal start of frame (sometimes referred to herein as ISOF) signal may reflect the start of each frame. In the example of FIG. 3, frame n starts at the ISOF signal at time t2, and frame n+1 starts at the ISOF signal at time t10.

The frame valid signal identifies when captured image data for the current frame is valid (e.g., when the captured image data is being sent over paths 38). The frame valid signal corresponding to a frame may be asserted at a time after the ISOF signal for that frame and before the ISOF signal for the next frame. For example, at time t3, the frame valid signal may be asserted, indicating that captured image data for frame n is valid.

At time t4 (e.g., between the ISOF signal for the current frame (n) at time t2 and the ISOF signal for the next frame (n+1) at time t10), master camera module 12A may begin to calculate algorithm values (e.g. auto algorithm values) for use with the next frame (n+1). Time t4 may be at any desired time between t2 and t10. At time t5, master camera module 12A may complete calculation of algorithm values and initiate transfer of the calculated algorithm values to slave module 12B. At time t6, the master-slave pair may complete the initialization phase and master camera module 12A may begin to transfer calculated algorithm values to slave camera module 12B. At time t8, master camera module 12A may complete the transfer of calculated algorithm values and slave camera module 12B may begin to deploy the transferred algorithm values for the next frame (n+1). At time t9, slave camera module 12B may finish deploying the transferred algorithm values for the next frame (e.g., slave camera module 12B may finish configuring camera sensor 14B for the next frame with transferred algorithm values such as exposure metrics, brightness metrics, gain metrics, red-blue ratios, etc.).

For proper deployment of transferred algorithm values for the next frame, the deployment of transferred algorithm values for the next frame should be completed before the ISOF signal signaling the start of the next frame (i.e., t9 should occur at a time before t10).

Delay-sensitive events may occur at any time during processing of frames. For example, at a time before the ISOF signal for the next frame and after the ISOF signal for the current frame, an internal start of exposure (ISOE) signal may be asserted within master camera module 12A. The internal start of exposure signal may reflect the start of exposure for the next frame. For example, the internal start of exposure signal at time t1 during frame n−1 may identify the time at which camera sensor 14A must begin exposure for frame n, the internal start of exposure signal at time t7 during frame n may identify the time at which camera sensor 14A must begin exposure for frame n+1, and the internal start of exposure signal at time t11 may identify the time at which camera sensor 14A must begin exposure for frame n+2. The time between the assertion of the internal start of exposure signal and the assertion of the frame valid signal may reflect the exposure length for the pixels captured in that frame. For example, the time between the internal start of exposure signal for frame n at time t1 and the frame valid signal at time t3 may correspond to a relatively short exposure length. The exposure length for frame n+1 due to the internal start of exposure signal at t7 may be relatively moderate (as an example). The exposure length for frame n+2 due to do the internal start of exposure signal at t11 may be relatively long (and may be approaching the upper limit of the exposure time for the capture framerate of camera modules 12). To assist in synchronizing master camera module 12A with slave camera module 12B, master camera module 12A may transfer (time-sensitive) event information such as the internal start of exposure signal to slave camera module 12B immediately after the event occurs.

Delay-sensitive events may occur during transfer of data from master camera module 12A and slave camera module 12B. An internal start of exposure signal may be asserted at time t7 while master camera module 12A is transferring calculated algorithm values to slave camera module 12B (as an example). To assist in synchronization between master camera module 12A and slave camera module 12B, master camera module 12A may prioritize the transfer of event information over the transfer of other data (e.g., master camera module 12A may insert information relating to the internal start of exposure signal at time t7 into the transfer of calculated algorithm values).

Figure 4A:
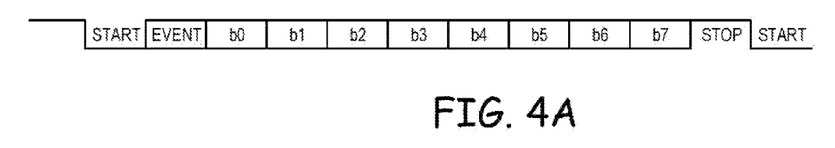
FIG. 4a is a schematic diagram of an illustrative byte transmission in accordance with an embodiment of the present invention.

The transfer of information from master camera module 12A to slave camera module 12B may use an interface such as a uni-directional interface (UDI) that uses a serial protocol to transfer information. As shown in FIG. 4A, the general format of a UDI byte may include a start bit, an event bit, eight data bits (i.e., one data byte), and a stop bit. As an example, the start bit may be a signal at a logic low (i.e., logic zero) voltage (e.g., a signal at a ground voltage). The event bit may describe the type of data being sent (e.g., whether or not the data corresponds to a time-sensitive event). As an example, the stop bit may be a signal at a logic high (i.e., logic one) voltage (e.g., a signal at a positive power supply voltage). The per-frame data transferred from a master camera module 12A to a slave camera module 12B may include many bytes encoded in this way.

Figure 4B:
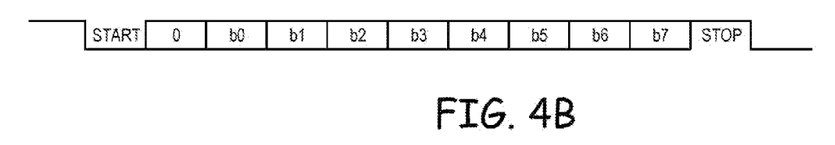
FIG. 4b is a schematic diagram of an illustrative data byte transmission in accordance with an embodiment of the present invention.

In FIG. 4B, an illustrative encoding for transferring a UDI data byte is shown. The UDI data byte may have a start bit set to logic zero, an event bit set to logic zero to identify the byte as a data byte, and data bits b0-b7 containing eight bits of information to be transferred.

Figure 4C:
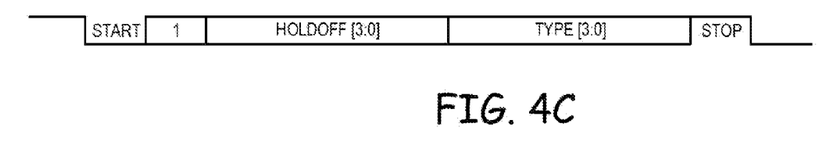
FIG. 4c is a schematic diagram of an illustrative event byte transmission in accordance with an embodiment of the present invention.

In FIG. 4C, an illustrative encoding for transfer of a UDI event byte is shown. The UDI event byte may have an event bit set to logic one (e.g., to identify the byte as corresponding to a time-sensitive event). Data bits b0-b3 of the UDI event byte may contain a holdoff count representing the delay between the occurrence of an event and the transfer of the UDI event byte corresponding to the event. Data bits b4-b7 of the UDI event byte may contain information describing the type of event that occurred.

Figure 5:
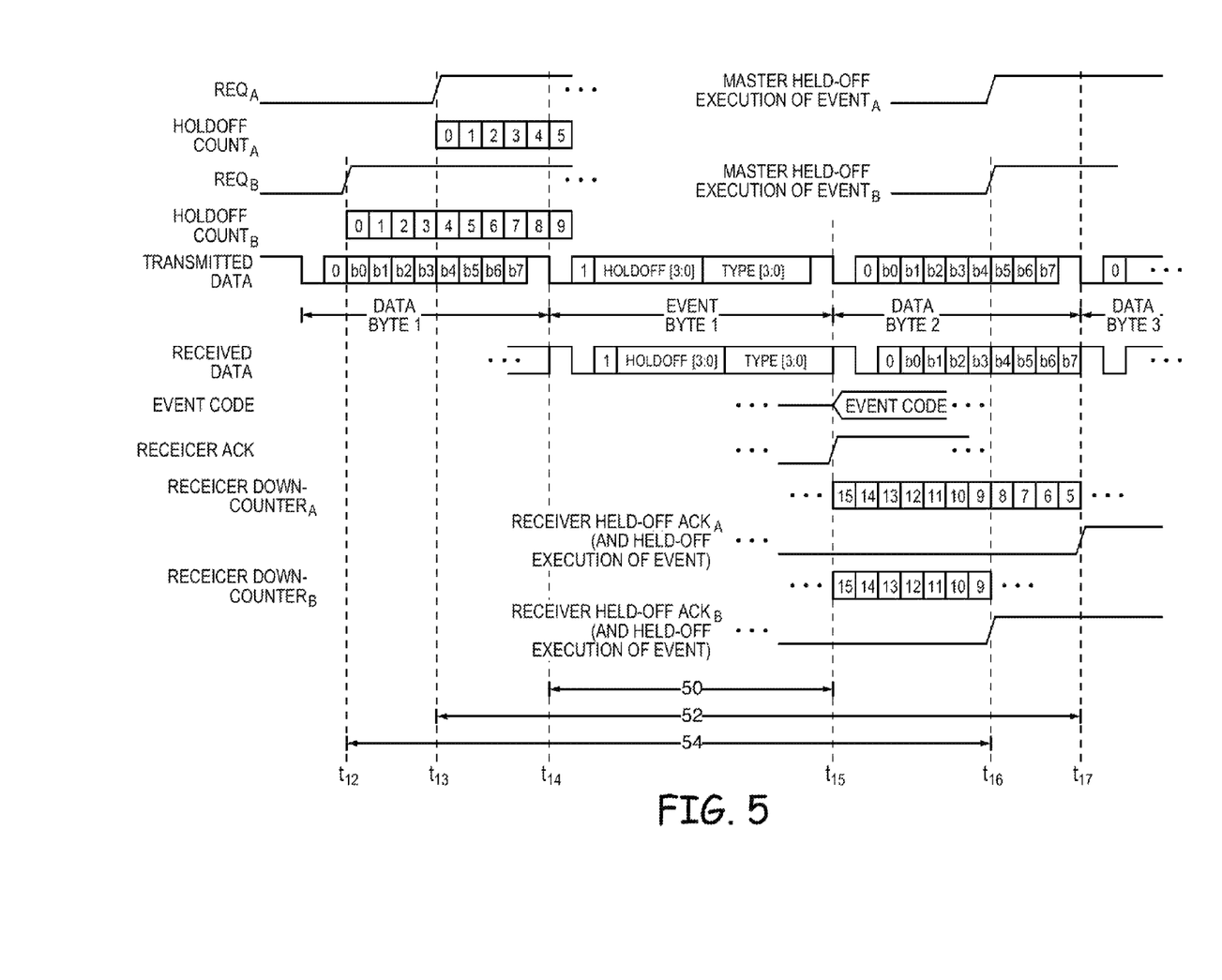
FIG. 5 is an illustrative timing diagram illustrating an arrangement in which real-time event bytes may be inserted into a data stream in accordance with an embodiment of the present invention.

FIG. 5 illustrates a first scenario (scenario A) and a second scenario (scenario B) in which a delay-sensitive event occurs during transfer of data between a master camera module 12A and a slave camera module 12B using the UDI protocol. In FIG. 5, a first data byte, second data byte, and third data byte are being transferred from a transmitter (e.g., a master camera module 12A) to a receiver (e.g., a slave camera module 12B) using the UDI protocol. The data bytes being transferred may be algorithm values calculated by master camera module 12A. In scenario A, a delay-sensitive event (e.g., an internal start of exposure signal) occurs during the transfer of bit 4 (b4) of data byte 1 (e.g., at time t13). In scenario B, a delay-sensitive event occurs during the transfer of bit 0 (b0) of data byte 1 (e.g., at time t12).

In scenario A, at time t13 during the transfer of data byte 1 from the transmitter to the receiver, a delay-sensitive event may occur at the transmitter (e.g., a $REQ_A$ event signal may be asserted in response to an internal start of exposure signal of master camera module 12A). In response to the occurrence of the delay-sensitive event, the transmitter may begin to count the number of transmission clock cycles until the start of the next UDI transmission at time t14 (e.g., the transmitter may use a holdoff counter to count the number of transmission clock cycles between time t13 and time t14). In scenario A, the holdoff counter may count 5 transmission clock cycles until the start of the next UDI transmission.

In scenario B, a delay-sensitive event may occur at time t12 during the transfer of data byte 1 from the transmitter to the receiver. In response to the occurrence of the delay-sensitive event at time t12, the transmitter in scenario B may begin to count the number of transmission clock cycles until the start of the next UDI transmission at time t14 (e.g., the transmitter may use a holdoff counter to count the number of transmission clock cycles between time t12 and time t14). In scenario B, the holdoff counter may count 9 transmission clock cycles until the start of the next UDI transmission.

In both scenario A and scenario B, a UDI event byte may be transferred from the transmitter to the receiver at the start of the next UDI byte transmission. The transmitter may set the holdoff field of the event byte to the holdoff count (e.g., 5 and 9 in the illustrative scenarios A and B, respectively). The transmitter may set the type field of the event byte to identify the event (e.g., the type field may be set to identify that an internal start of exposure occurred in the transmitter).

After the event byte is transferred, the transmitter may resume transfer of data to the receiver by transferring data byte 2 and data byte 3 to the receiver. The transfer of data byte 2 and data byte 3 may be delayed by the time associated with the transfer of the event byte.

When the receiver receives the entire transmitted event byte at time t15, the receiver may acknowledge the receipt of the event byte, may set an event code corresponding to the type, and may initiate a down-counter (e.g., the receiver may begin counting down from an initial value of 15 in the down-counter). When the down-counter reaches the value sent in the holdoff field of the transmitted event byte, the receiver may execute the event (e.g., slave camera module 12B may assert a held-off ACK and may execute the event triggered or requested by the received event byte). In scenario A, the held-off ACK is asserted and the event in the receiver (and, optionally in the transmitter) may be triggered at time t17. In scenario B, the held-off ACK is asserted and the event in the receiver (and, optionally in the transmitter) may be triggered at time t16.

The transmission and use of the holdoff field in the UDI protocol may cause a fixed delay between the occurrence of an event at the transmitter and the execution of the event at the receiver. The fixed delay may be constant regardless of the time of the occurrence of the event. The fixed delay may be the sum of the event byte transmission time 50 and the initial value of the down-counter. In the example of scenario A, fixed delay 52 may be the sum of the delay from t13 to t14 (e.g., 5 transmission clock cycles), event byte transmission time 50 (e.g., 11 transmission clock cycles), and the delay from t15 to t17 (e.g., 11 transmission clock cycles). Fixed delay 52 in the example of scenario A may be 28 transmission clock cycles. In the example of scenario B, fixed delay 54 may be the sum of the delay from t12 to t14 (e.g., 9 transmission clock cycles), event byte transmission time 50 (e.g., 11 transmission clock cycles), and the delay from t15 to t16 (e.g., 7 clock cycles). Fixed delay 54 in the example of scenario B may be 28 transmission clock cycles (e.g., fixed delay 54 of scenario B may be equal to fixed delay 52 of scenario A).

Because of the existence of the fixed delay, master camera module 12A may be able to synchronize events within both camera modules 12A and 12B. In particular, master camera module 12A may be able to ensure that events corresponding to event signals such as internal start of exposure signals are executed simultaneously and at a predetermined time in both modules 12A and 12B. For example, an internal start of exposure (ISOF) event may occur in master camera module 12A and master camera module 12A may transmit a corresponding event byte to slave camera module 12B. Master camera module 12A may delay the execution of the internal start of exposure event by a fixed delay (e.g., fixed delay 52 or 54) to synchronize with the execution of the ISOF event at slave camera module 12B. In scenario A, the execution of the held-off event at master camera module 12A (e.g., start of exposure event) may occur at time t17 simultaneously with the execution of the held-off event at slave camera module 12B. In scenario B, the execution of the held-off event at master camera module 12A may occur at time t16 simultaneously with the execution of the held-off event at slave camera module 12B.

If desired, holdoff information associated with the delay before an event can be transmitted from master module 12A to slave module 12B (in at least some alternative arrangements). In arrangements of these types, master camera module 12A may be able to ensure that events corresponding to event signals such as internal start of exposure signals are executed simultaneously, but may not be able to ensure that the events are executed exactly at a predetermined time (e.g., the exact time at which the events are executed may vary appropriately randomly within the range of possible delays between the initial event signal and when the event signal can be transmitted to slave module 12B).

System on chips (SOCs) with UDI circuitry similar to that described may be used in various configurations. In the examples of FIG. 6A-6D, each system on chip (SOC) 60 may contain respective UDI circuitry 62. The UDI circuitry 62 may be used to implement a UDI protocol. Path 30A may convey data (SDA) and path 30B may convey clock information.

Each UDI may be configured in many modes. It should be evident to one skilled in the art that an efficient implementation is possible where multiple modes can be supported in a single design. In a first mode (Mode1), the UDI transmits data on a path 40; the data is generated within the SOC 60. In a second mode (Mode2), the UDI receives data on a path 32, makes that data available to the SOC 60 and transmits the data unchanged on a path 40; the data may be used by another device connected to path 40. In a third mode (Mode3) the UDI behaves in the same way as Mode2 with the exception that a different protocol may be supported on path 32 and path 40 (e.g., a protocol with restricted capabilities but designed in such a way that it can be generated simply by a non-UDI device). Each SOC 60 may include registers that allow the mode of its UDI to be selected.

Figure 6A:
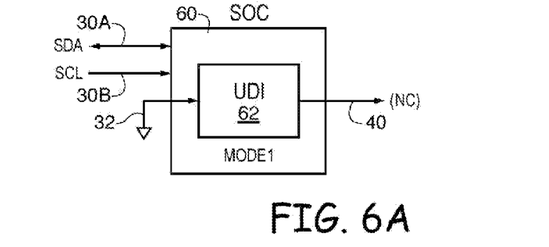
FIG. 6A is a schematic diagram of an illustrative system that may include a single master camera module in accordance with an embodiment of the present invention.

In FIG. 6A, a single SOC 60 with UDI circuitry 62 may be used alone (e.g., SOC 60 may include registers which configure its UDI in the aforementioned Mode1, and no slave camera modules are configured). The configuration of 60 may allow data to be transmitted on path 40 when no slave is attached to that path.

Figure 6B:
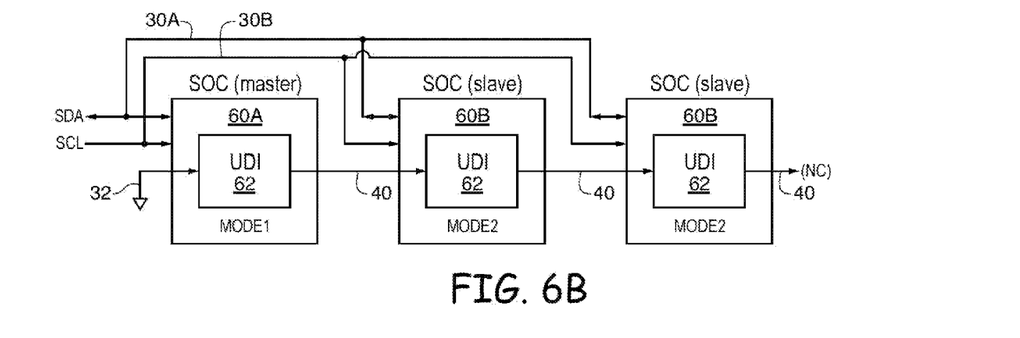
FIG. 6B is a schematic diagram of an illustrative system that may include a master camera module and a slave camera module in accordance with an embodiment of the present invention.

In FIG. 6B, SOC 60A may be configured as a master camera module (e.g., in the aforementioned Mode1) and a single SOC 60B may be configured as a slave camera module (e.g., in the aforementioned Mode2). The system may initially operate in a configuration mode in which path 40 is used to control the addressing of paths 30A, and may subsequently operate in a mode in which the master camera module may use the UDI protocol to communicate with the slave camera module over path 40. The arrangement of FIG. 6B may be extended to accommodate additional slave cameras configured and controlled in topology where there UDI circuitry is connected in a daisy-chain topology.

Figure 6C:
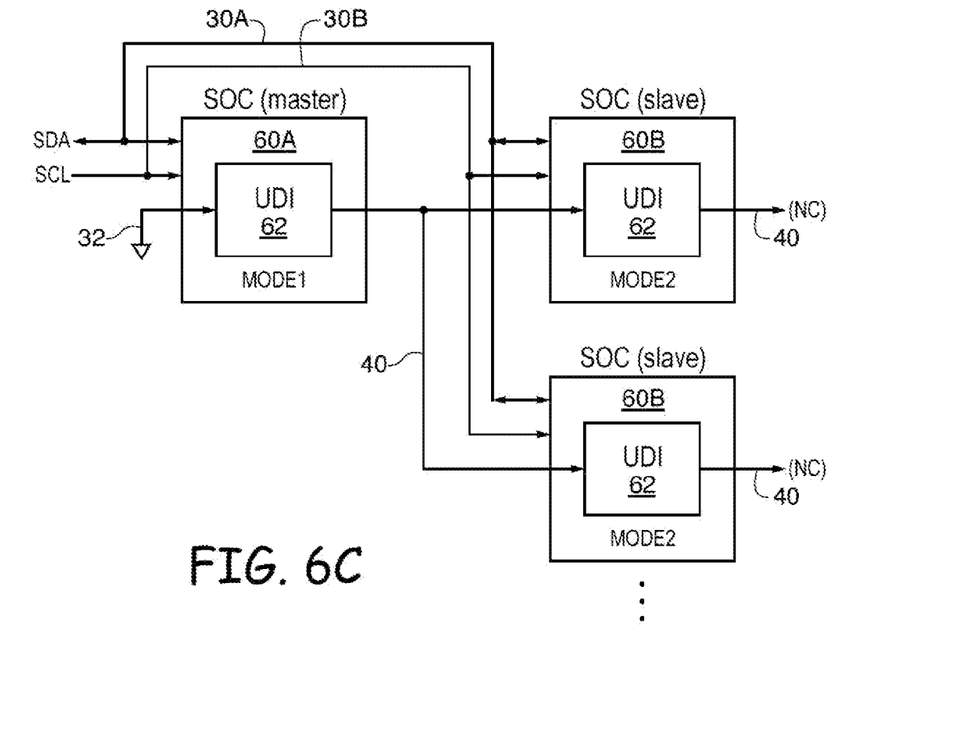
FIG. 6C is a schematic diagram of an illustrative system that may include a master camera module and two slave camera modules in accordance with an embodiment of the present invention.

In FIG. 6C, SOC 60A may be configured as a master camera module (e.g., in the aforementioned Mode1) and two or more SOCs 60B may be configured as slave camera modules (e.g., in the aforementioned Mode2). The master camera module may use the UDI protocol to communicate with the slave camera modules over path 40.

Figure 6D:
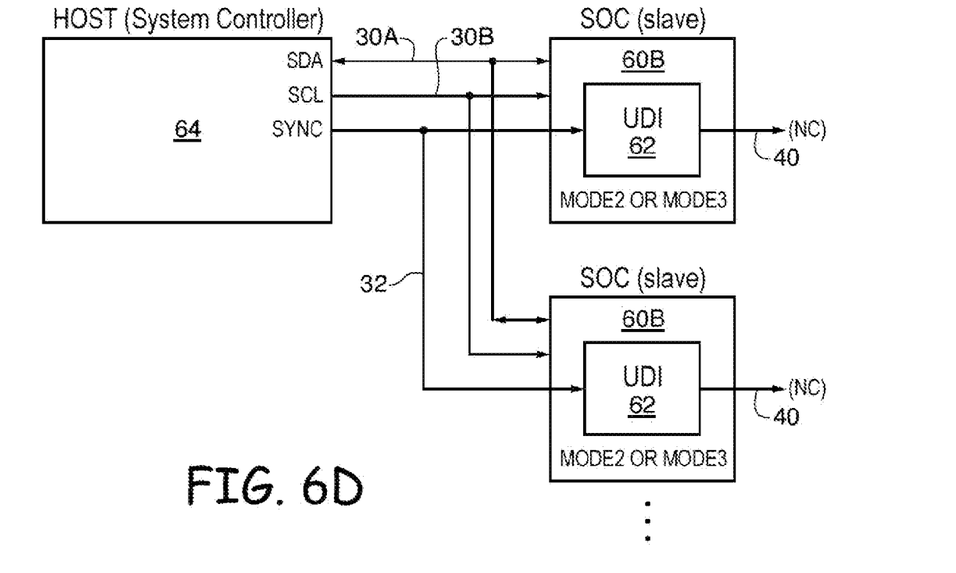
FIG. 6D is a schematic diagram of an illustrative system that may include a host controller and two slave camera modules in accordance with an embodiment of the present invention.

In FIG. 6D, a host (e.g., system controller) may be used with two or more slave camera modules (e.g., two or more slave camera modules operating in the aforementioned Mode2). The host of FIG. 6D may use the UDI protocol to communicate with the slave camera modules over path 32. Alternatively, the host of FIG. 6D may use a simplified protocol to communicate with the slave camera modules (e.g., two or more slave camera modules operating in the aforementioned Mode3) and this simplified protocol may restrict the facilities possible in this configuration.

Figure 7:
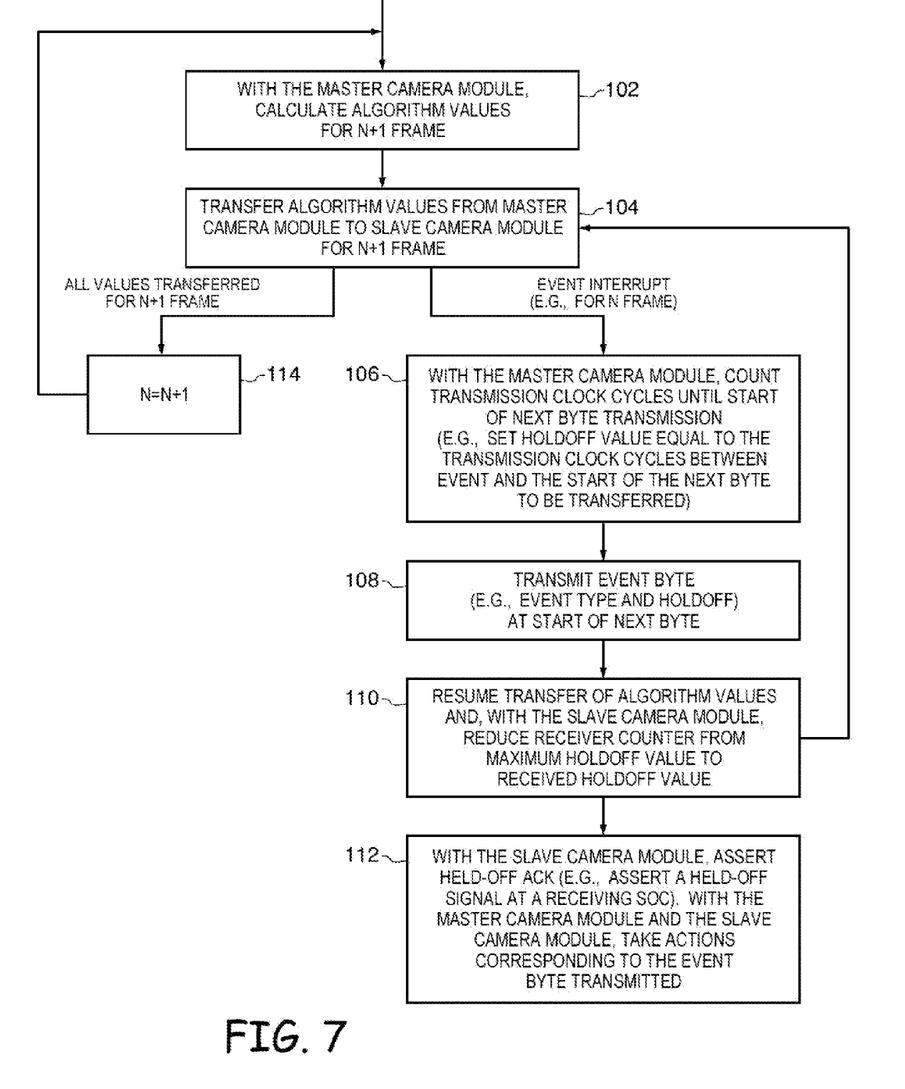
FIG. 7 is a flow chart of illustrative steps that may be involved in transferring a combination of real-time event bytes and non-timing-critical data bytes from a master camera module to a slave camera module in accordance with an embodiment of the present invention.

The flow chart of FIG. 7 illustrates a process by which a master camera module may calculate algorithm values, transfer the algorithm values to one or more slave camera modules, and transfer information describing events that occur during the transfer of algorithm values.

The master camera module may calculate algorithm values for use with the next frame (e.g., frame N+1) during the operations of step 102 (e.g., after the internal frame start for frame N).

During the operations of step 104, the calculated algorithm values may be transferred from the master camera module to the slave camera module using the UDI protocol. If an event occurs during the operations of step 104 (e.g., a delay-sensitive internal start of exposure signal), the operations of step 106 may be performed. Once the transfer of all calculated algorithm values for the next frame is complete, the master may move to the next frame (e.g., N=N+1, as shown by step 114).

During the operations of step 106, the master camera module may count the number of transmission clock cycles between the occurrence of the event and the start of the next byte transmission. For example, the master camera module may calculate a holdoff value equal to the transmission clock cycles between an internal start of exposure signal and the time at which the next byte can begin to be transferred.

During the operations of step 108, the master camera module may transmit an event byte at the start of the next byte transmission that corresponds to the event that occurred. The event byte may include information describing the type of the event and the holdoff value set during the operations of step 106.

During the operations of step 110, the master camera module may resume the transfer of algorithm values (step 104). The slave camera module may reduce, as time passes, a receiver counter from a maximum holdoff value to the received holdoff value. The slave camera module may reduce the receiver counter with every transmission clock cycle.

During the operations of optional step 112, the slave camera module may assert a held-off ACK signal at a receiving SOC.

During the operations of step 112, the master and slave camera modules may simultaneously execute code or take an action corresponding to the event byte transmitted in step 108.

Various embodiments have been described illustrating systems and methods for synchronizing and controlling image sensors.

Electronic devices may include camera modules and host subsystems. Camera modules may include camera sensors and image processing and data circuitry. Camera sensors may include image sensors and associated lens. Camera modules may communicate with host subsystems. Camera modules may communicate with other camera modules using a unidirectional (UDI) protocol. A first camera module may be configured as a master camera module. One or more camera modules may be configured as a slave camera module. The master camera module may control some of the operations of the slave camera module. The master camera module may transmit data to the slave camera module that directs the slave camera module in capturing images. Delay-sensitive events may occur at the master camera module. The master camera module may interrupt data transmission to the slave, when a delay-sensitive event occurs, by transmitting information corresponding to the event. The slave camera module may respond to the event information with a predetermined fixed delay relative to the occurrence of the event at the master camera module.

UDI-compliant circuitry (e.g., camera modules with circuitry compliant with the UDI protocol) may be formed in system on chip (SOC) devices. SOCs with UDI-compliant circuitry may be configured in any combination of master camera modules and slave camera modules. Each master camera module may control and communicate with one or more slave camera modules using the UDI protocol. A host (e.g. system controller) may be used to control and communicate with one or more camera modules using the UDI protocol.

The foregoing is merely illustrative of the principles of this invention which can be practiced in other embodiments.

What is claimed is:

1. A method of controlling, in an electronic device, a first camera module that includes a first image sensor and a second camera module that includes a second image sensor, the method comprising:
   with the first camera module, transmitting a plurality of data packets including at least one image capture parameter to the second camera module;
   in response to assertion of a start of exposure signal during a currently transmitting data packet, counting a number of transmission clock cycles until complete transmission of the currently transmitting data packet;
   with the first camera module, interrupting transmission of the plurality of data packets by transmitting a control packet identifying the start of exposure signal and the counted number of transmission clock cycles to the second camera module;
   with the second camera module, receiving the control packet; and
   with the second camera module, capturing an image with the second image sensor at a delayed time based on the counted number of transmission clock cycles from the control packet.

2. The method defined in claim 1 further comprising:
   with the first camera module, calculating the at least one image capture parameter with circuitry in the first camera module; and
   with the first image sensor, capturing an image using the at least one image capture parameter calculated by the circuitry in the first camera module, wherein capturing the image with the second image sensor comprises, with the second image sensor, capturing the image using the at least one image capture parameter calculated by the circuitry in the first camera module.

3. The method defined in claim 2 wherein transmitting the plurality of data packets comprises transmitting at least first and second data packets and wherein transmitting the control packet to the second camera module comprises transmitting the control packet to the second camera module between transmission of the first data packet and transmission of the second data packet.

4. The method defined in claim 2 wherein the at least one image capture parameter comprises at least one parameter selected from the group consisting of: an exposure setting, a gain setting, a color temperature setting, a framerate setting, an ambient brightness value, and a color correction setting.

5. The method defined in claim 1 wherein:
   capturing the image with the first image sensor comprises starting a first exposure after a first amount of time following the assertion of the start of exposure signal in the first camera module; and
   capturing the image with the second image sensor comprises starting a second exposure after a second amount of time following the transmission of the start of exposure signal, wherein the second amount of time is based at least partly on the counted number of transmission clock cycles from the control packet.

6. The method defined in claim 5 wherein starting the first and second exposures comprises starting the first and second exposure substantially simultaneously.

7. A method of controlling first and second camera modules in an electronic device, the method comprising:
   with the first camera module, calculating an image capture parameter with circuitry in the first camera module;
   with the first camera module, transmitting a data packet including the image capture parameter to the second camera module;
   in response to a real-time event occurring during transmission of the data packet, identifying an amount of time between the real-time event and completion of the transmission of the data packet;
   with the first camera module, transmitting to the second camera module a control packet that identifies the real-time event and the amount of time between the real-time event and completion of the transmission of the data packet;
   with the first camera module, capturing at least one image using the image capture parameter calculated by the circuitry in the first camera module and based on the amount of time between the real-time event and completion of the transmission of the data packet; and
   with the second camera module, capturing at least one image using the image capture parameter calculated by the circuitry in the first camera module and based on the amount of time between the real-time event and completion of the transmission of the data packet.

8. The method defined in claim 7 wherein the at least one image capture parameter comprises at least one parameter selected from the group consisting of: an exposure setting, a gain setting, a color temperature setting, a framerate setting, an ambient brightness value, and a color correction setting.

9. The method defined in claim 7 further comprising:
   with the electronic device, combining the captured images from the first and second camera modules to form three dimensional images.

10. An electronic device, comprising:
    first and second camera modules, wherein at least the first camera module comprises circuitry that calculates an image capture parameter and wherein the first and second camera modules are each configured to capture at least one image using the image capture parameter calculated by the circuitry in the first camera module, wherein the first camera module transmits a data packet identifying the image capture parameter, wherein, in response to a real-time event during transmission of the data packet, the first camera module counts a number of transmission clock cycles until the data packet is completely transmitted to the second camera module, and wherein the first camera module sends a control packet that identifies the real-time event and the number of transmission clock cycles to the second camera module.

11. The electronic device defined in claim 10 wherein the first camera module comprises a first image sensor configured to capture the at least one image using the image capture parameter calculated by the circuitry in the first camera module and wherein the second camera module comprises a second image sensor configured to capture the at least one image using the image capture parameter calculated by the circuitry in the first camera module.

12. The electronic device defined in claim 10 wherein the first camera module comprises a first image sensor configured to capture the at least one image using the image capture parameter calculated by the circuitry in the first camera module, wherein the second camera module comprises a second image sensor configured to capture the at least one image using the image capture parameter calculated by the circuitry in the first camera module, and wherein the image capture parameter comprises a parameter selected from the group consisting of: an exposure setting, a gain setting, a color temperature setting, a framerate setting, an ambient brightness value, and a color correction setting.

13. The electronic device defined in claim 10 wherein the first and second camera modules are coupled together and wherein the first camera module is configured to transmit the image capture parameter to the second camera module.

14. A method comprising:
interconnecting a plurality of devices in a daisy-chain topology, wherein the plurality of devices comprises a master and at least one slave;
using the daisy-chain connection, during an initialization phase, to assign at least one unique address to each device in the daisy-chain;
using the daisy-chain connection, after initialization, as a path to pass data from the master to the at least one slave in the daisy-chain;
in response to a real-time event occurring during a data transmission, counting a number of transmission clock cycles until an occurrence of a pre-defined boundary in the data transmission; and
subsequent to the occurrence of the pre-defined boundary in the data transmission, transmitting from the master to the at least one slave, with the real-time event, a value that indicates an amount of delay between the first time and the occurrence of the pre-defined boundary in the data transmission.

15. The method defined in claim 14 further comprising:
at the at least one slave, calculating the first time based on at least the received value.

16. The method defined in claim 15 further comprising:
at the at least one slave and at the master, performing an action in response to the real-time event, wherein the at least one slave and the master use the value in synchronizing their performances of the action.

17. The method defined in claim 14 further comprising:
determining performance characteristics for each of the devices of the plurality of devices; and
selecting a given one of the devices of the plurality of devices as the master based on the performance characteristics.

18. The method defined in claim 14 wherein the master and the slave comprise camera sensors, wherein the real-time event at the master comprises an internal start of exposure event of an image frame, and wherein performing the action at the master and the slave comprises beginning exposure for the image frame with the camera sensors.

* * * * *